United States Patent
Lusty et al.

(10) Patent No.: US 12,311,820 B2
(45) Date of Patent: May 27, 2025

(54) SIDE TIPPER SYSTEM

(71) Applicant: LUSTY TIP TRAILERS PTY LTD, Queensland (AU)

(72) Inventors: Graham Ronald Lusty, Queensland (AU); Christopher Graham Lusty, Queensland (AU); Roger Ronald Hill, Queensland (AU)

(73) Assignee: Lusty Tip Trailers Pty Ltd, Queensland (AU)

( * ) Notice: Subject to any disclaimer, the term of this patent is extended or adjusted under 35 U.S.C. 154(b) by 864 days.

(21) Appl. No.: 17/611,247

(22) PCT Filed: May 14, 2020

(86) PCT No.: PCT/AU2020/050474
§ 371 (c)(1),
(2) Date: Nov. 15, 2021

(87) PCT Pub. No.: WO2020/227773
PCT Pub. Date: Nov. 19, 2020

(65) Prior Publication Data
US 2022/0212589 A1    Jul. 7, 2022

(30) Foreign Application Priority Data

May 15, 2019   (AU) ................................ 2019901656

(51) Int. Cl.
*B60P 1/00*    (2006.01)
*B60P 1/16*    (2006.01)
(Continued)

(52) U.S. Cl.
CPC .................. *B60P 1/34* (2013.01); *B60P 1/165* (2013.01); *B60P 1/267* (2013.01)

(58) Field of Classification Search
CPC .............. B60P 1/34; B60P 1/165; B60P 1/267
(Continued)

(56) References Cited

U.S. PATENT DOCUMENTS

| | | | | |
|---|---|---|---|---|
| 2,599,618 | A * | 6/1952 | Dempster | B65D 90/623 |
| | | | | 294/68.21 |
| 3,738,707 | A | 6/1973 | Bieber | |
| 7,722,125 | B1 * | 5/2010 | Hehn | B60P 1/165 |
| | | | | 298/18 |
| 2016/0318434 | A1 * | 11/2016 | Petrick | B62D 63/08 |
| 2017/0057393 | A1 * | 3/2017 | Steger | B60P 1/165 |

FOREIGN PATENT DOCUMENTS

| | | |
|---|---|---|
| WO | 97/33768 A1 | 9/1997 |
| WO | 00/71385 A1 | 11/2000 |

(Continued)

OTHER PUBLICATIONS

PCT International Search Report and Written Opinion of the International Search Authority Dated Jun. 11, 2020, Application No. PCT/AU2020/050474, Applicant Lusty Tip Trailers Pty Ltd, 8 Pages.

(Continued)

*Primary Examiner* — Steven O Douglas
(74) *Attorney, Agent, or Firm* — Brooks Kushman P.C.

(57) ABSTRACT

A side tipper system for a vehicle includes a container for carrying material and selectively discharging carried material. The container includes a container body defining an upper portion of a first side wall, a second side wall opposing the first side wall, and a pair of opposing end walls; a floor pivotally coupled to the second side wall; and a side door pivotally coupled to the floor and defining a lower portion of the first side wall in a closed position and forming a discharge opening in an open position. The system further includes end assemblies configured to be mounted to a vehicle chassis at respective ends of the container, each end assembly operatively coupled to the container for supporting the container and for controlling discharge of material by:

(Continued)

moving the side door from the closed position to the open position; and lifting the container body relative to the chassis.

20 Claims, 10 Drawing Sheets

(51) Int. Cl.
*B60P 1/267* (2006.01)
*B60P 1/34* (2006.01)

(58) Field of Classification Search
USPC .......................................................... 298/11
See application file for complete search history.

(56) References Cited

FOREIGN PATENT DOCUMENTS

| | | |
|---|---|---|
| WO | 2009/062250 A1 | 5/2009 |
| WO | 2015/011685 A2 | 1/2015 |

OTHER PUBLICATIONS

PCT International Preliminary Report on Patentability Dated Nov. 16, 2021, Application No. PCT/AU2020/050474, Applicant Lusty Tip Trailers Pty Ltd, 5 Pages.

* cited by examiner

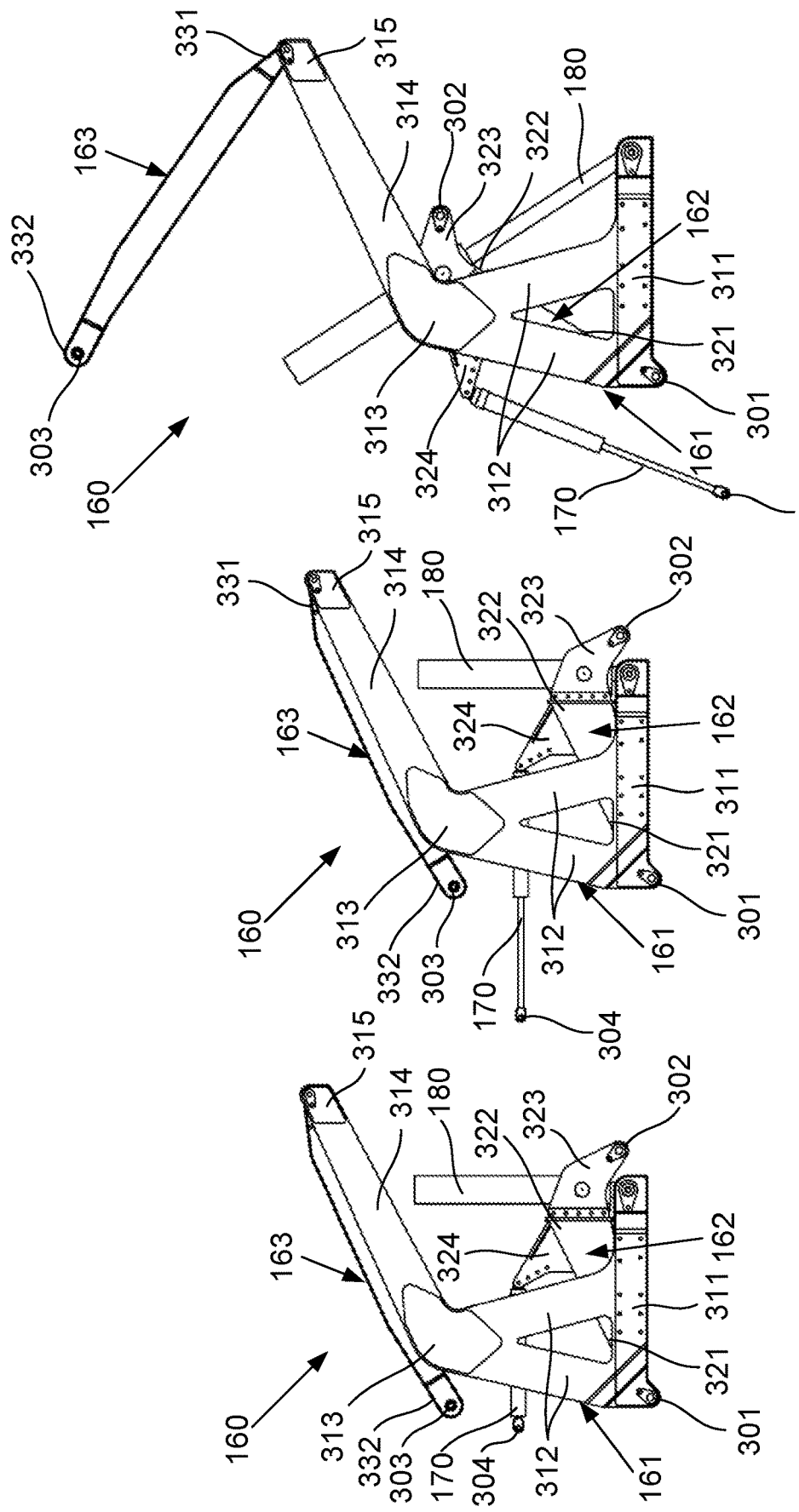

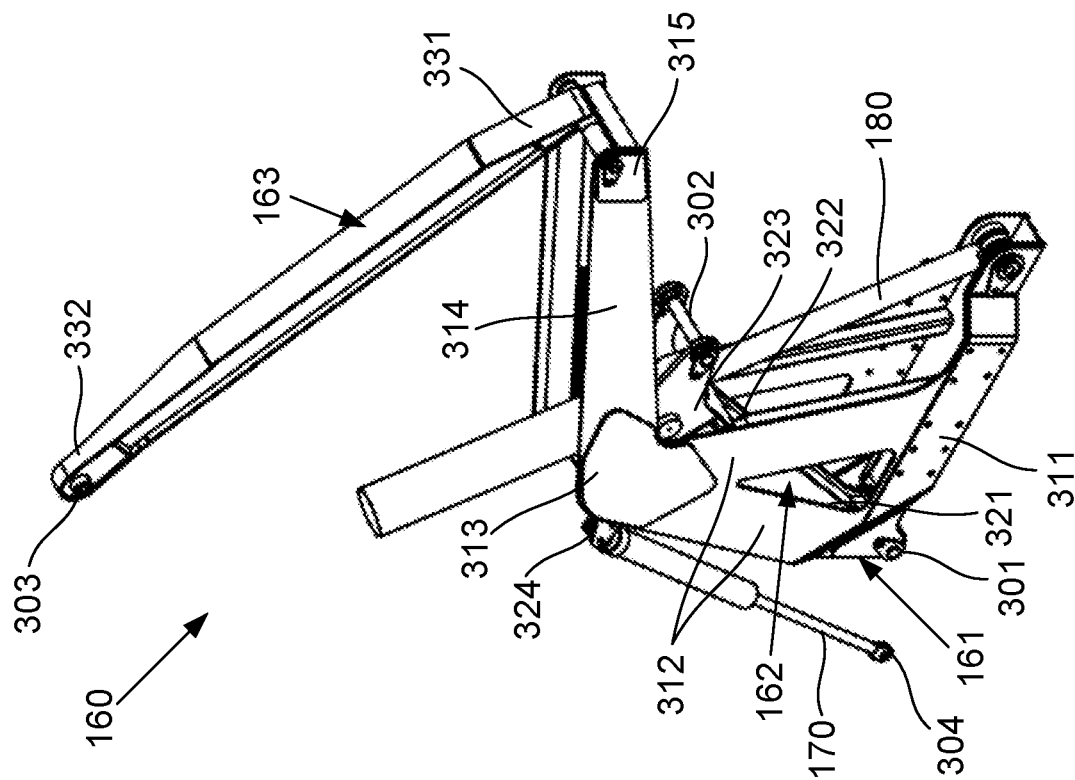
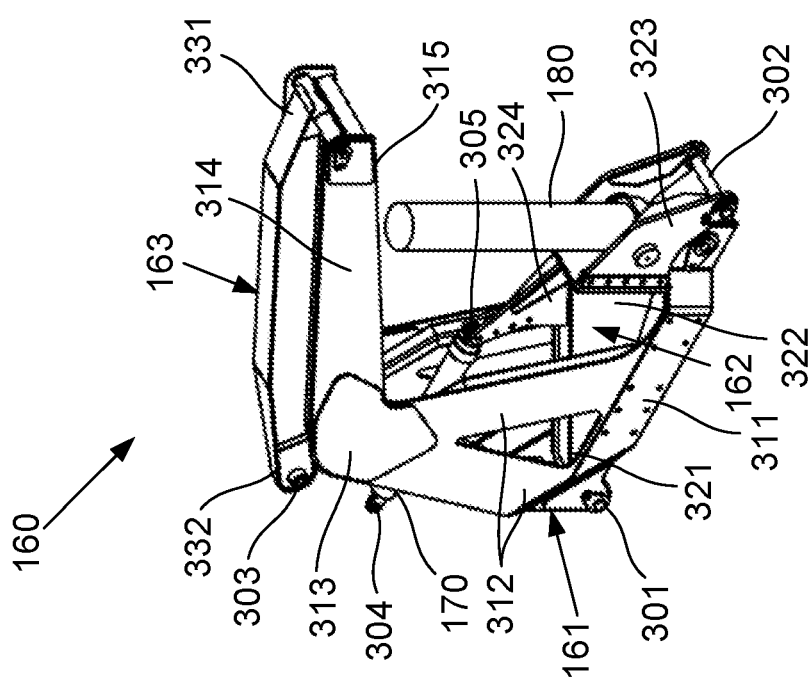
Fig. 4B
Fig. 4A

SIDE TIPPER SYSTEM

CROSS-REFERENCE TO RELATED APPLICATIONS

This application is the U.S. national phase of PCT Application No. PCT/AU2020/050474 filed on May 14, 2020, which claims priority to Australian Patent Application No. 2019901656 filed on May 15, 2019, the disclosures of which are incorporated in their entireties by reference herein.

BACKGROUND OF THE INVENTION

The present invention relates to a side tipper system for a vehicle, particularly for allowing material to be carried by the vehicle and discharged to a lateral side of the vehicle.

DESCRIPTION OF THE PRIOR ART

Tipper trucks and tipper trailers are used for bulk materials handling to facilitate carrying and discharging of material at a desired location without requiring additional equipment to facilitate the discharge.

Rear tipper systems are commonly used, and typically provide an open box container that is hinged at the rear and lifted at the front by a hydraulic cylinder or the like, allowing carried material to be discharged to the rear of the vehicle. Side tipper systems are known but less commonly used. These allow carried material to be discharged to a lateral side of the vehicle, which can allow for faster discharge and higher weight capacity.

Some simple examples of known side tipper systems operate by tipping the container onto its side to discharge carried material to the side of the vehicle. More sophisticated examples of known side tipper systems involve complex container assemblies and actuator arrangements that move parts of the container in a coordinated sequence to facilitate the discharge of materials.

However, conventional side tipper vehicles can be prone to tipping over if the discharge of materials is stopped prematurely, for instance if material becomes stuck in the container. This problem can be exacerbated in side tipper systems that move the centre of gravity of the container to the discharge side during discharge.

Side tipper vehicles can also experience problems with discharged material fouling the path of the vehicle's wheels. Whilst this can be addressed by designing the system to discharge material further to the side of the vehicle, this can lead back to the aforementioned problem of the vehicle being prone to tipping over.

WO00/71385A1 discloses a vehicle side tipper system comprising a container body, a displaceable side wall located on a discharge side of the container body, the side wall being flexibly connected with the rest of the container body, at least one actuation assembly for displacing the side wall to an open position, and for tipping the container body such that product held within the container body can be tipped from the discharge side thereof when the side wall is in the open position.

WO2009/062250A1 discloses a bulk material handling vehicle including a chassis and a load carrying container supported thereon, the container arranged for pivotable movement relative to the chassis of the vehicle to discharge material from the container in a lateral direction to a side of the chassis, the container including a lower container body and an upper container body mounted thereto for operable movement with respect to said lower container body to provide a selectively openable discharge passage e.g. via openable side discharge door, between the upper and lower container bodies when the upper and lower bodies pivot with respect to one another.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF THE PRESENT INVENTION

In one broad form, an aspect of the present invention seeks to provide a side tipper system for a vehicle including a chassis supported by wheels, the system including: a container for carrying material and selectively discharging carried material to a lateral discharge side of the chassis, the container including: a container body defining an upper portion of a first side wall of the container on the discharge side, a second side wall of the container opposing the first side wall, and a pair of opposing end walls of the container; a floor pivotally coupled to the second side wall; and a side door pivotally coupled to the floor, the side door defining a lower portion of the first side wall of the container in a closed position and forming a discharge opening in an open position; and first and second end assemblies mounted to the chassis at respective ends of the container, each end assembly being operatively coupled to the container for supporting the container relative to the chassis and controlling the discharge of carried material from the container by: moving the side door from the closed position to the open position; and lifting the container body relative to the chassis, to thereby cause carried material to be discharged to the discharge side via the discharge opening.

In one embodiment, the end assemblies are configured so that lifting the container body causes the floor to pivotally rotate away from the container body to thereby define a discharge ramp for directing material to the discharge side.

In one embodiment, the end assemblies are configured so that lifting the container body causes the floor to be oriented at a ramp angle that depends on a lifting height to which the container body is lifted.

In one embodiment, the side door in the open position effectively extends the discharge ramp laterally beyond the chassis on the discharge side.

In one embodiment, the end assemblies are configured so that lifting the container body causes the container body to tip away from the discharge side.

In one embodiment, the end assemblies are configured so that lifting the container body causes the second side wall to be oriented at a tipping angle that depends on a lifting height to which that the container body is lifted.

In one embodiment, when the container body is lifted to a predetermined lifting height, the second side wall and the floor are substantially aligned.

In one embodiment, when the container body is lifted to the predetermined height, the second side wall, the floor and the side door are substantially aligned to define a substantially continuous discharge ramp.

In one embodiment, the side door is substantially aligned with the upper portion of the first side wall in the closed position and substantially aligned with the floor in the open position.

In one embodiment, when the container body is not lifted: a base of the upper portion of the first side wall is offset from the floor; and the side door extends between the floor and the offset base of the upper portion of the first side wall in the closed position.

In one embodiment: moving the side door to the open position forms the discharge opening between the floor and the offset base of the upper portion of the first side wall; and lifting the container body expands the discharge opening.

In one embodiment, the floor includes: a first floor edge that is pivotally coupled to a base of the second side wall; and an opposing second floor edge that is pivotally coupled to the side door.

In one embodiment, the side door includes: a first door edge that is pivotally coupled to the second floor edge; and an opposing second door edge that abuts a base of the upper portion of the first side wall when the side door is in the closed position.

In one embodiment, the second floor edge is pivotally coupled to the end assemblies such that the second floor edge is not lifted when the container body is lifted.

In one embodiment, the floor includes a pair of opposing end plates protruding from respective ends of the floor such that, when the container body is not lifted, the end plates extend inside the container body alongside the end walls, and when the container body is lifted, the end plates extend between the floor and the end walls.

In one embodiment, at least one of: each end plate includes a curved edge; each end wall has a smooth inside surface having a shape corresponding to a respective end plate shape; and each end wall includes a plate guide for supporting an edge of a respective end plate.

In one embodiment, each end assembly is provided as a modular assembly that can be adapted for use at either end of the container.

In one embodiment, each end assembly is configured to be mounted onto the chassis and coupled to interface points provided at the respective end of the container.

In one embodiment, each end assembly includes a lifting actuator for lifting the container body relative to the chassis.

In one embodiment, each end assembly includes: a frame; a lever arm pivotally coupled to the frame and the container body; and a linkage pivotally coupled to the frame and the container body.

In one embodiment, the lifting actuator pivotally rotates the lever arm relative to the frame for lifting the container body and the linkage controls an orientation of the container body as the container body is lifted.

In one embodiment, the frame includes: a frame base for mounting the end assembly to the chassis; and a frame arm extending away from the discharge side.

In one embodiment: the lever arm has a first lever end pivotally coupled to the frame base on the discharge side and a second lever end pivotally coupled to the container body proximate to the base of the second side wall; and the linkage has a first linkage end pivotally coupled to a distal end of the frame arm and a second linkage end pivotally coupled to the container body proximate to the base of the upper portion of the first side wall.

In one embodiment, the lifting actuator is pivotally coupled to the frame and the lever arm.

In one embodiment, the lifting actuator is a cylinder actuator configured so that extension of the lifting actuator causes the lever arm to pivotally rotate relative to the frame, thereby causing the container body to be lifted.

In one embodiment, each end assembly includes a door actuator for moving the side door between the closed position and the open position.

In one embodiment, each end assembly includes a frame and a lever arm pivotally coupled to the frame, and wherein the door actuator is pivotally coupled to the lever arm and the side door.

In one embodiment, the door actuator is a cylinder actuator configured so that extension of the door actuator causes the side door to pivotally rotate between the closed position and the open position.

In another broad form, an aspect of the present invention seeks to provide a vehicle including: a chassis supported by wheels; and a side tipper system as described above.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which:—

FIG. 3A is an end view of an end assembly of the system of FIG. 2A with its actuators retracted;

FIG. 3B is an end view of the end assembly of FIG. 3A with a door actuator extended;

FIG. 3C is an end view of the end assembly of FIG. 3A with the door actuator and a lifting actuator both extended;

FIG. 4A is a perspective view of the end assembly of FIG. 3A with its actuators retracted;

FIG. 4B is a perspective view of the end assembly of FIG. 3C with the door actuator and the lifting actuator both extended;

DETAILED DESCRIPTION OF THE PREFERRED EMBODIMENTS

Figure 1A:
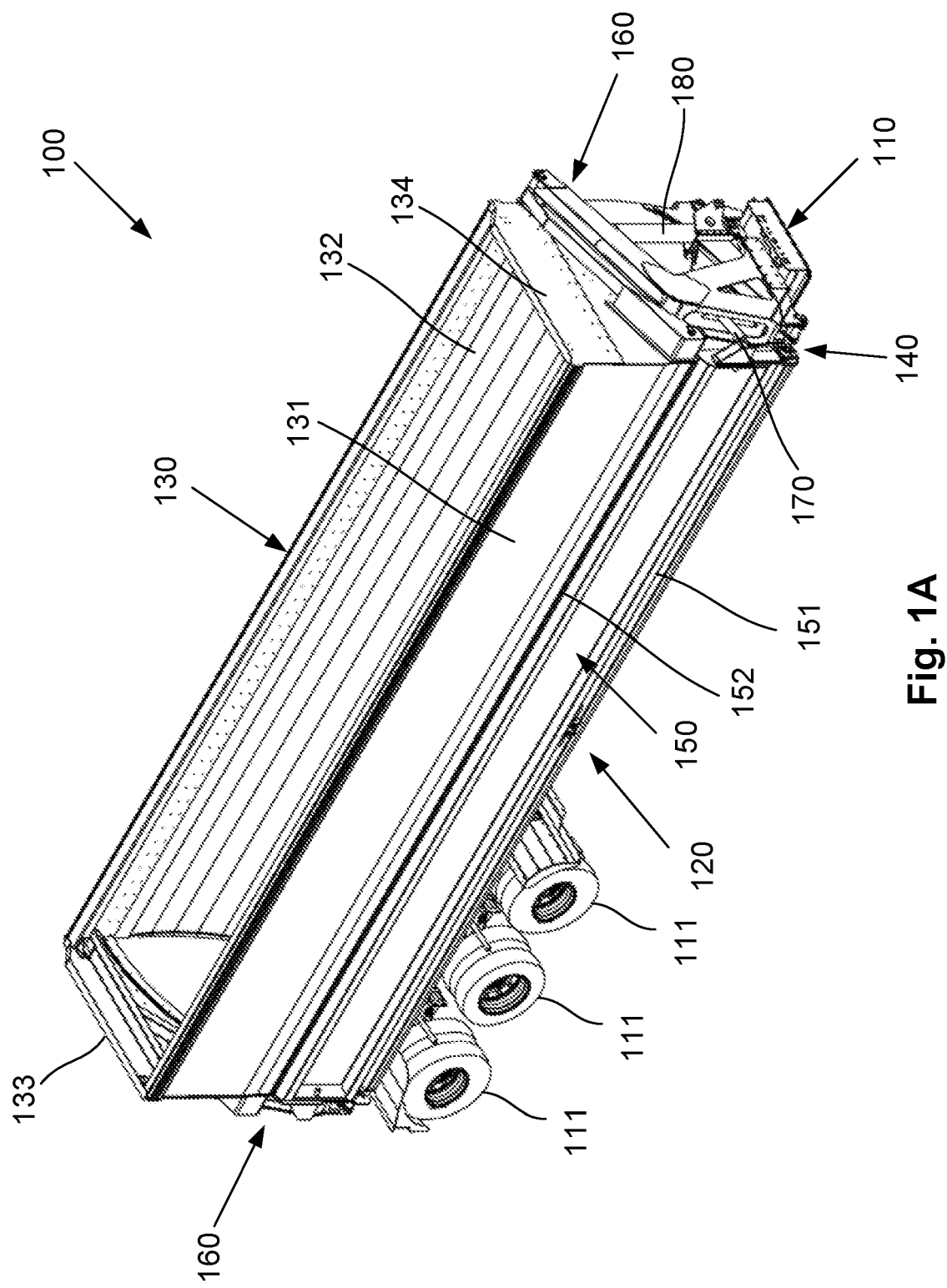
FIG. 1A is a perspective view of an example of a vehicle including a side tipper system having a container configured for carrying material.

An example of a side tipper system for a vehicle 100 will now be described with reference to FIGS. 1A to 1D.

The system will typically be provided for use with a vehicle 100 including a chassis 110 supported by wheels 111. In the current example, the vehicle 100 is in the form of a trailer that may be driven by a prime mover in use, although the system may be used with alternative types of vehicles, such as a truck or a carriage.

In broad terms, the system includes a container 120 for carrying material and selectively discharging carried material to a lateral discharge side of the chassis 110, along with first and second end assemblies 160 mounted to the chassis 110 at respective ends of the container 120. Each end assembly 160 is operatively coupled to the container 120 for supporting the container 120 relative to the chassis 110 and controlling the discharge of carried material from the container 120.

The container 120 includes a container body 130 defining an upper portion of a first side wall 131 of the container 120 on the discharge side, a second side wall 132 of the container 120 opposing the first side wall 131, and a pair of opposing end walls 133, 134 of the container 120. The container 120 further includes a floor 140 pivotally coupled to the second side wall 132, and a side door 150 pivotally coupled to the floor 140. The side door 150 effectively defines a lower portion of the first side wall 131 of the container 120 in a closed position (as shown in FIGS. 1A and 1C) and forms a discharge opening in an open position (as shown in FIGS. 1B and 1D).

Figure 1B:
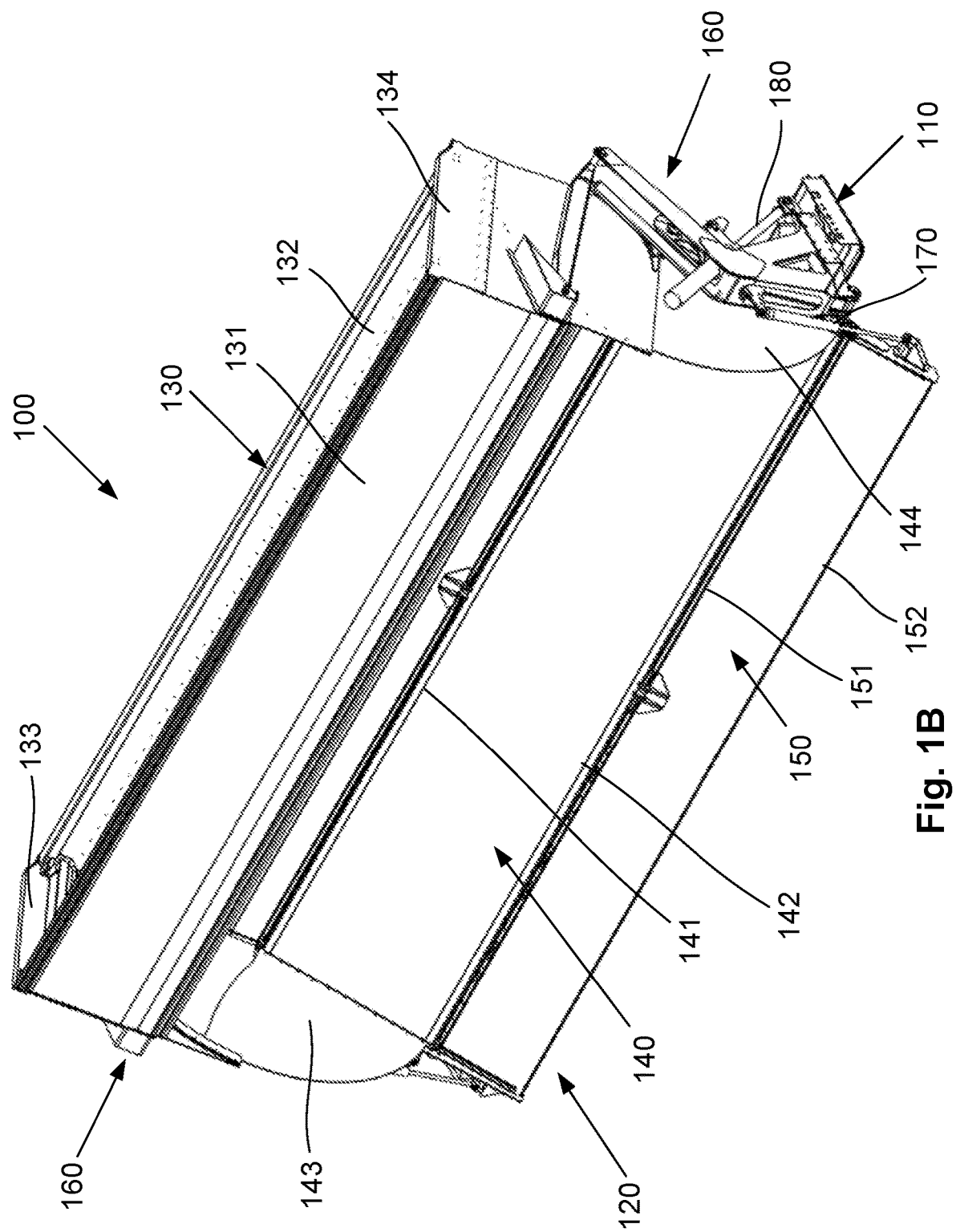
FIG. 1B is a perspective view of the vehicle of FIG. 1A in which the container is configured for discharging material.
Figure 1C:
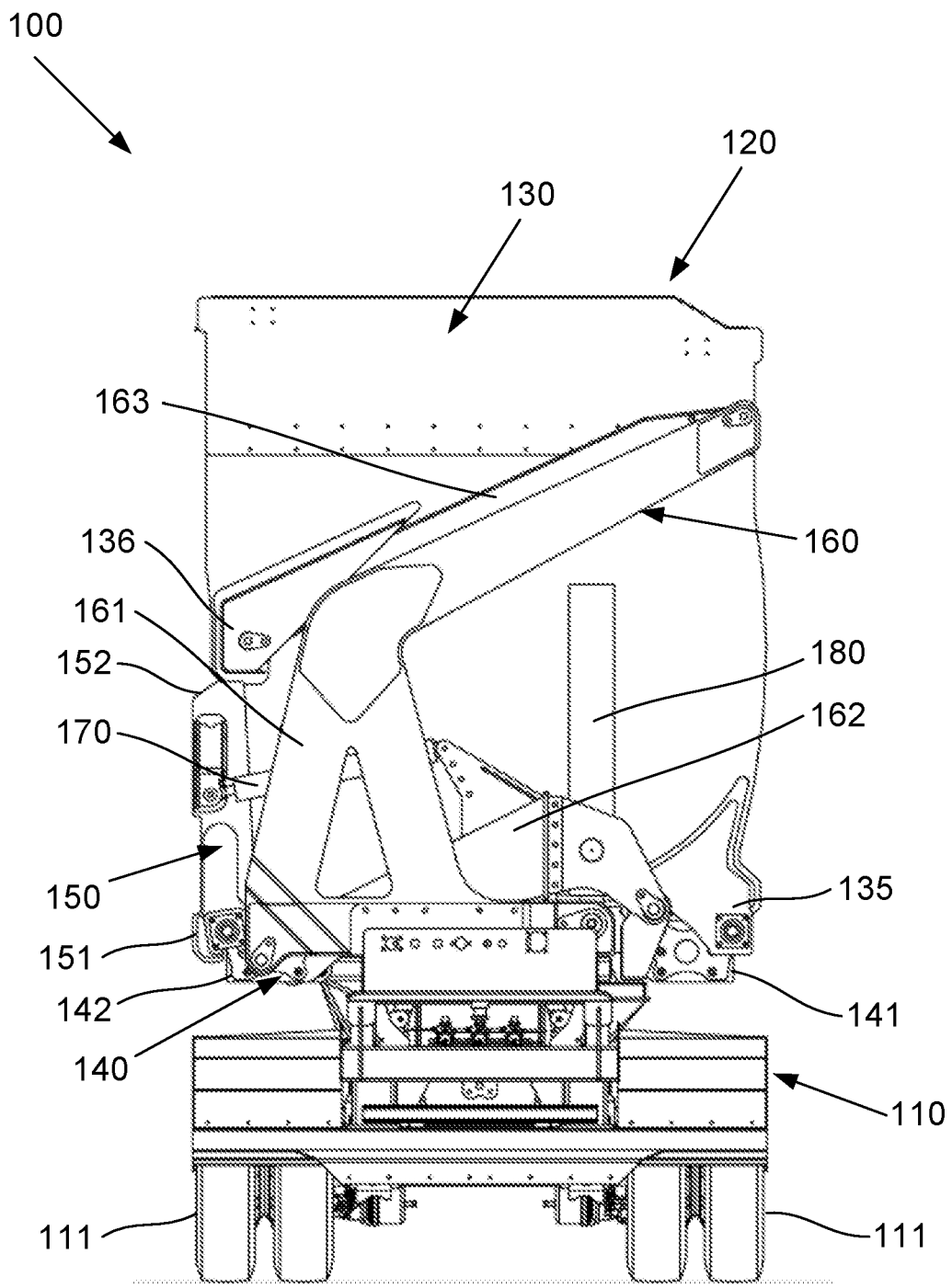
FIG. 1C is an end view of the vehicle of FIG. 1A.
Figure 1D:
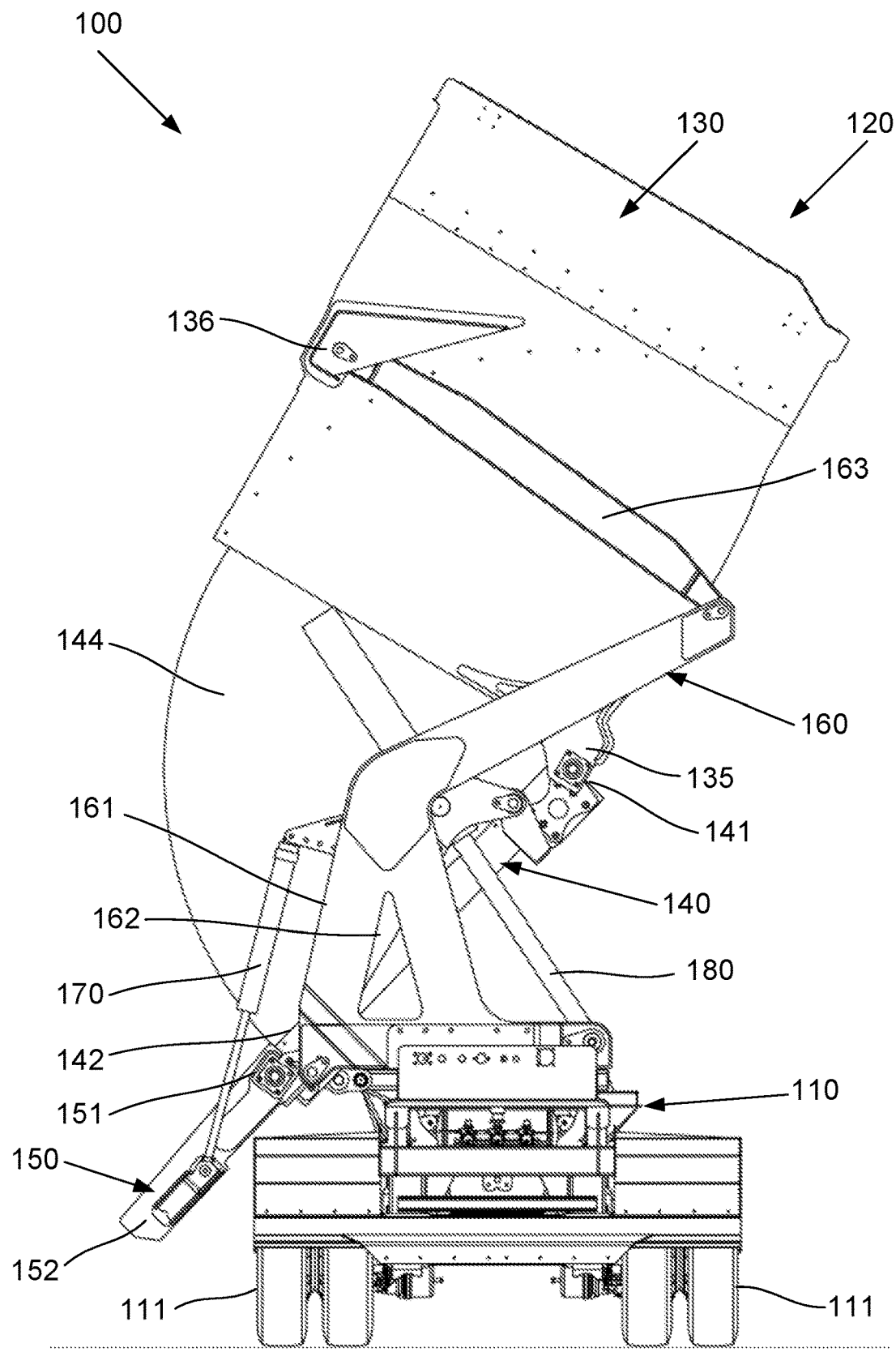
FIG. 1D is an end view of the vehicle of FIG. 1B.

Each end assembly is particularly configured to control the discharge of carried material from the container 120 by moving the side door 150 from the closed position to the open position, and lifting the container body 130 relative to the chassis 110 (as shown in FIGS. 1B and 1D), to thereby cause carried material to be discharged to the discharge side via the discharge opening.

In view of the above, it will be appreciated that the system can facilitate the discharge of material from the container 120 using a lifting motion that can help to avoid moving the centre of gravity of the container 120 and material laterally with respect to the chassis. As can be seen in FIGS. 1B and 1D, the container body 130 remains in a substantially central position after lifting, whilst the floor 140 and the side door 150, being pivotally moveable to the container body 130, may assume a position for directing the material to the discharge side of the vehicle 100.

Accordingly, the design of the system can help to avoid problems encountered in previous side tipper designs, such as the risk of tipping over in situations where the container is moved laterally during discharge, and discharging material too close to the vehicle.

Moreover, the system may be implemented using modular construction by having self-contained end assemblies 160 for mounting the container 120 to the chassis 110 and providing the interfaces for supporting and controlling operation of the discharge procedure.

Furthermore, in view of the relatively straightforward arrangement of the container using pivotally connected floor 140 and side door components 150, as opposed to some of the more complex container arrangements seen in conventional systems, lightweight yet robust construction techniques may be used, such as forming the container parts using aluminium rather than the more traditional choice of steel.

Further preferred or optional features of the system will now be outlined.

Each end assembly 160 may be provided as a modular assembly that can be adapted for use at either end of the container 120. It will be appreciated that this can help to reduce the unique parts count of the system and facilitate easier installation and maintenance of the system. Preferably, each end assembly 160 will be configured so that it simply needs to be mounted on the chassis 110 and coupled to interface points provided at the respective end of the container 120.

In the example shown in FIGS. 1A to 1D, each end assembly 160 includes a door actuator 170 for moving the side door 150 between the closed position and the open position, and a lifting actuator 180 for lifting the container body relative to the chassis. However, different arrangements of actuators may be used. For example, in some implementations, the door actuator 170 may be omitted and movement of the side door 150 may be controlled by mechanically linking the side door 150 to the lifting actuator 180.

Preferably, the end assemblies 160 are configured so that lifting the container body 130 causes the floor 140 to pivotally rotate away from the container body 130, to thereby define a discharge ramp for directing material to the discharge side. This is best seen in FIG. 1D. It will be appreciated that, as the container body 130 is lifted, material carried in the container 120 will be allowed to slide across the discharge ramp provided by the floor 140 and exit the discharge opening that is formed by the side door 150 in the open position.

The end assemblies 160 may be configured so that lifting the container body 130 causes the floor 140 to be oriented at a ramp angle that depends on a lifting height to which the container body 130 is lifted. For instance, as lifting commences the floor 140 will define a shallow ramp angle and as the container body 130 is lifted higher, the ramp angle will become proportionally steeper. In use, the container body 130 may be lifted up to a sufficient lifting height to complete the discharge of material that may depend on qualities of the particular material such as its angle of repose.

With further regard to FIG. 1D, it will be appreciated that the side door 150 in the open position may effectively extend the discharge ramp formed by the floor 140 laterally beyond the chassis 110 on the discharge side. Thus, discharged material can be directed to a position further away from the vehicle 100, to help to prevent the discharged material fouling the wheels 111. However, it should be understood that the system achieves this without having to move the container 120 onto the discharge side, thereby avoiding the risk of tipping over that can arise in conventional side tipper arrangements where this is the case.

Preferably, the end assembly 160 is configured so that lifting the container body 120 causes the container body 120 to tip away from the discharge side, as can also be seen in FIG. 1D. It will be appreciated that this tipping movement of the container body 120 can assist in the effective discharge of material across the discharge ramp formed by the floor 140 and open side door 150, especially in the case of wet or irregular materials that may be prone to becoming stuck in the container 120.

The end assemblies 160 may be configured so that lifting the container body 130 causes the second side wall 132 to be oriented at a tipping angle that depends on a lifting height to which the container body 130 is lifted. For instance, as lifting commences the second side wall 132 will move from a substantially vertical orientation to define a small tipping angle and as the container body 130 is lifted higher, the tipping angle will become proportionally greater.

In some implementations, when the container body 130 is lifted to a predetermined lifting height, the second side wall 132 and the floor 140 may become substantially aligned, as in the configuration depicted in FIG. 1D. It will be appreciated that, when the container body 130 is lifted to the predetermined height, the second side wall 132, the floor 140 and the side door 150 may each be substantially aligned to define a substantially continuous discharge ramp. Thus, material can be allowed to readily slide from the container body 130 along the floor 140 and side door 150 to be discharged to the discharge side.

Typically, the side door 150 will be substantially aligned with the upper portion of the first side wall 131 in the closed position. When the container body 130 is not lifted, a base of the upper portion of the first side wall 131 may be offset from the floor 140, and the side door 150 may extend between the floor 140 and the offset base of the upper portion of the first side wall 131 in the closed position.

On the other hand, the side door 150 will typically be substantially aligned with the floor 140 in the open position, and it will be appreciated that this facilitates the extension of the discharge ramp formed by the floor 140 as the container body 130 is lifted, as discussed above.

Thus it should be understood that, in the example described above, moving the side door 150 to the open position will form the above mentioned discharge opening between the floor 140 and the offset base of the upper portion of the first side wall 131, and lifting the container body 130 will expand the discharge opening. As can be seen in FIGS. 1B and 1D, this expansion of the discharge opening may be even further increased by the above discussed functionality of the end assemblies 160 for simultaneously tipping the container body 130 as it is lifted.

With regard to FIGS. 1A to 1D, the floor 140 typically includes a first floor edge 141 that is pivotally coupled to a base of the second side wall 132, and an opposing second floor edge 142 that is pivotally coupled to the side door 150. In turn, the side door 150 includes a first door edge 151 that is pivotally coupled to the second floor edge 142, and an opposing second door edge 152 that abuts a base of the upper portion of the first side wall 131 when the side door 150 is in the closed position.

The second floor edge 142 may be pivotally coupled to the end assemblies 160 such that the second floor edge 142 is not lifted when the container body 130 is lifted. It will be appreciated that this may be used to control how the floor 140 defines a discharge ramp as the container body 130 is lifted, as discussed above.

As can be seen in FIGS. 1A to 1D, the floor 140 may also include a pair of opposing end plates 143, 144 protruding from respective ends of the floor 140. Further details of these end plates 143, 144 can be seen in the detailed views of the floor 140 in FIGS. 6A and 6B. When the container body 130 is not lifted (as per FIGS. 1A and 1C), the end plates 143, 144 extend inside the container body 130 alongside the end walls. On the other hand, when the container body 130 is lifted (as per FIGS. 1B and 1D), the end plates 143, 144 extend between the floor and the end walls.

It will be appreciated that these end plates 143, 144 will help to prevent the material from overflowing from the ends of the discharge ramp defined by the floor 140 and the open side door 150. These end plates 143, 144 may be considered to define an effective discharge chute in conjunction with the discharge ramp.

The end plates 143, 144 may be provided with a curved edge as can be seen in FIGS. 1B and 1D and FIGS. 6A and 6B. It is noted that the curvature of the curved edge will typically correlate to the curved arc through which the floor 140 will pivotally rotate relative to the container body 130.

The end walls 133, 134 of the container body 130 may also have specific adaptations to allow effective operation of the end plates 143, 144. For example, as shown in the detailed views of the container body 130 in FIGS. 5A and 5B, each end wall 133, 134 may have a smooth inside surface 510 having a shape corresponding to a respective end plate 143, 144 shape. This surface 510 will preferably be kept free of protrusions or obstructions to allow a close parallel relationship between the end plates 143, 144 and the end walls 133, 134. Accordingly, in the preferred embodiment of the system, the container body 130 is configured so that interfaces to other elements of the system are provided outside of this surface 510 corresponding to the end plates 143, 144. Furthermore, each end wall 133, 134 may include a plate guide 520 for supporting an edge of a respective end plate 143, 144. It will be appreciated that this can prevent sliding friction between the end walls 133, 134 and the end plates 143, 144 whilst permitting lighter construction of the end plates 143, 144.

Whilst not shown in the Figures, the side door 150 may also include a pair of opposing shedder plates protruding from respective ends of the side door 150. These may have a similar function as the end plates 143, 144, i.e. for helping to direct the discharge of material and preventing overflow from ends of the side door 150 which it is in the open position.

Figure 2A:
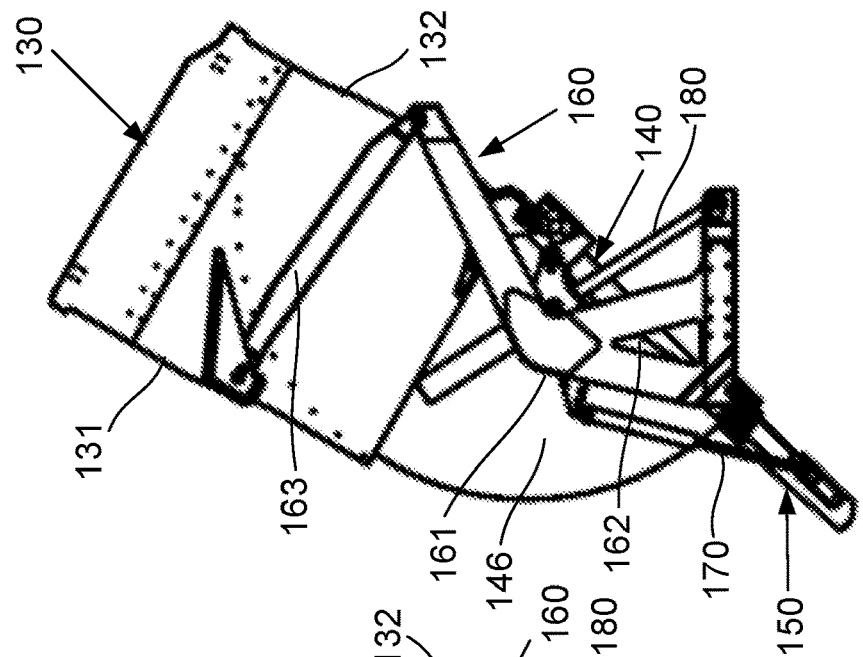
FIG. 2A is an end view of the side tipper system of FIG. 1A, in which the system is configured for carrying material.
Figure 2B:
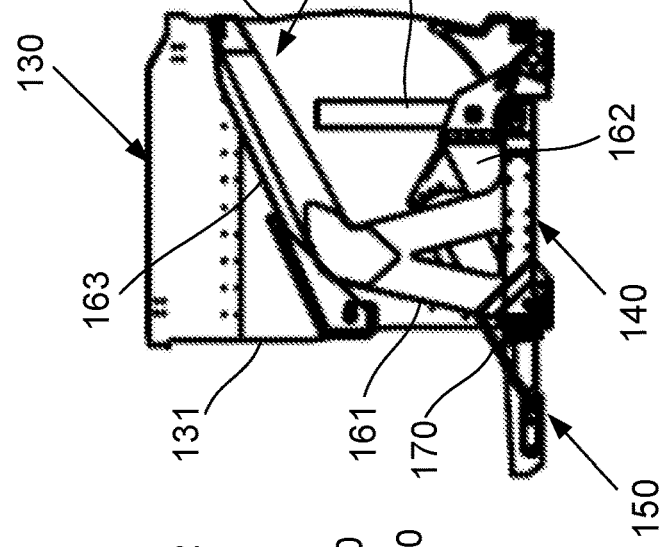
FIG. 2B is an end view of the side tipper system of FIG. 2A with a side door of the container moved to an open position.
Figure 2C:
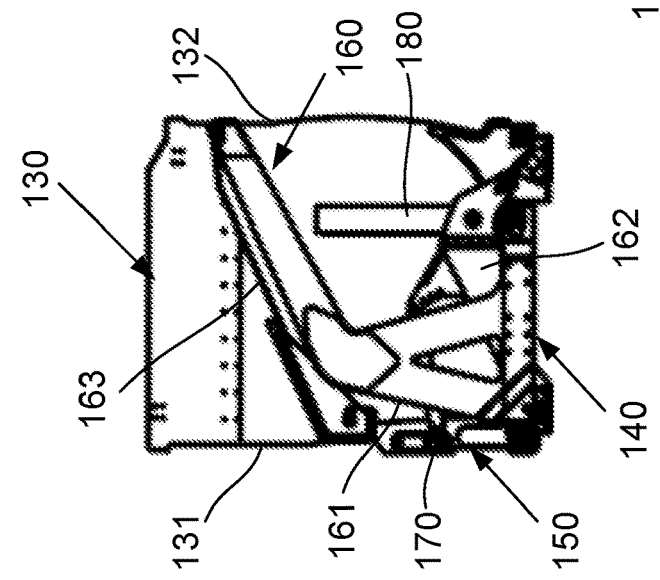
FIG. 2C is an end view of the side tipper system of FIG. 2A, in which the system is configured for discharging material.

FIGS. 2A to 2C show simplified representations of the container 120 and an end assembly 160 in different operational positions, and FIGS. 3A to 3C show more detailed views of the end assembly 160 corresponding to the positions of FIGS. 2A to 2C.

In preferred embodiments, each end assembly 160 generally includes the main elements of a frame 161, a lever arm 162 pivotally coupled to the frame 161 and the container body 130; and a linkage 163 pivotally coupled to the frame 161 and the container body 130, along with the door actuator 170 and the lifting actuator 180 as mentioned above.

FIG. 2A particularly shows the container 120 arranged in its normal material carrying configuration, in which the side door 150 is in the closed position and the container body 130 has not been lifted. Typically, the door actuator 170 and the lifting actuator 180 will be provided as cylinder actuators, such as hydraulic or pneumatic cylinders, and in this example both actuators are in a retracted state during this carrying configuration, as can be observed in the corresponding FIG. 3A.

Usually, the first step in discharging material from the container 120 is causing the side door 150 to move to the open position, where the side door 150 pivotally rotates into alignment with the floor 140 as shown in FIG. 2B. This is achieved using the door actuator 170, typically by extending the door actuator 170 as shown in the corresponding FIG. 3B. This serves to form the discharge opening below the upper portion of the first side wall 131.

However, it should be appreciated that the side door 150 does not need to be moved completely to the open position before lifting of the container body 130 commences. In some implementations, the container body 130 may be lifted whilst the side door 150 is being opened. Accordingly, the side door 150 may be progressively moved from the closed position towards the open position as the container body 130 is being lifted. It will be appreciated that this can allow the door actuator 170 and the lifting actuator 180 to be activated simultaneously rather than in sequence. Despite this, it is preferable to have the side door 150 move completely to the open position at a predetermined point in the lifting process to ensure that the side door 150 can effectively extend the discharge ramp provided by the floor 140 and thus not impede the discharge of material.

FIG. 2A shows an example configuration of the container 120 and the end assembly 160 after the container body 130 has been lifted. It should be noted that lifting the container body 130 is a continuous procedure and the speed of lifting and the final lifting height may be varied depending on requirements and subject to the actual discharge of material. For example, some materials, such as easily flowing particulate materials, may be discharged without needing to lift the container body 130 as high as for other materials, such as irregularly shaped or sticky materials that may require higher discharge ramp angles.

In any event, lifting of the container body 130 is achieved using the lifting actuator 180, typically by extending the lifting actuator 180 as shown in the corresponding FIG. 3C. In this example, extension of the lifting actuator 180 causes the container body 130 to be lifted using a lever arrangement facilitated by the lever arm 162. In addition, the container body 130 may be tipped as it is lifted, with the tipping motion of the container body 130 being controlled by the linkage 163. In particular, the end assembly 160 may be configured so that the lifting actuator 180 pivotally rotates the lever arm 162 relative to the frame 161 for lifting the container body 130, whilst the linkage 163 controls an orientation of the container body 130 as the container body is lifted. The movements of the lever arm 162 and the linkage 163 due to extension of the lifting actuator 180 can be seen more clearly in FIG. 3C.

Specific details of an example configuration of the end assembly 160 for achieving this functionality will now be described with further regard to FIGS. 3A to 3C and the perspective views of the end assembly in FIGS. 4A and 4B.

In this example, the frame 161 particularly includes a frame base 311 for mounting the end assembly 160 to the chassis 110, and a frame arm 314 extending away from the discharge side, i.e. to a non-discharge side of the chassis 110. The frame 161 may also include connecting structure extending between the frame base 311 and the frame arm 314 such as the frame struts 312 extending upwardly from the frame base and the frame junction 313 into which the frame struts come together and from which the frame arm 314 extends as shown. However, it will be appreciated that the particular configuration of the frame 161 is not essential, and different arrangements of connecting structures may be used in the frame 161 whilst providing similar functionality.

In any event, in this example, the lever arm 162 has a first lever end 321 pivotally coupled to the frame base 311 on the discharge side and a second lever end 322 pivotally coupled to the container body 130 proximate to the base of the second side wall 132. Turning back to FIGS. 1A to 1D, it will be seen that the second level end 322 may be coupled to a first container fitting 135 via a fitting at the first door end 141.

The linkage 163 has a first linkage end 331 pivotally coupled to a distal end 315 of the frame arm 314 and a second linkage end 332 pivotally coupled to the container body 130 proximate to the base of the upper portion of the first side wall 131. As can be seen in FIGS. 1A to 1D, the second level end 332 may be coupled to a second container fitting 136 that protrudes above the area that is occupied by the end plates 143, 144.

The lifting actuator 180 may be pivotally coupled to the frame 161 and the lever arm 162. In this example, the lifting actuator 180 is specifically coupled to the frame base 311 on the non-discharge side, and coupled to the lever arm 162 near the second lever end 322. A lifting actuator bracket 323 may be provided at the second lever end 322 to facilitate attachment of the lifting actuator 180 to the lever arm 162. In this example, the lifting actuator bracket 323 extends beyond the second lever end 322 and may also facilitate coupling the lever arm 162 to the container body 130. Typically, the lifting actuator 180 is a cylinder actuator configured so that extension of the lifting actuator 180 causes the lever arm 162 to pivotally rotate relative to the frame 161, thereby causing the container body 130 to be lifted, as mentioned above.

The door actuator 170 may be pivotally coupled to the lever arm 162 and the side door 150. In this particular example, a door actuator bracket 324 is provided at the second lever end 322 to facilitate attachment of the door actuator 170 to the lever arm 162. The door actuator bracket 324 extends transversely from lever arm 162 so that the door actuator 170 is offset from the lever arm 162. Typically, the door actuator 170 is a cylinder actuator configured so that extension of the door actuator 170 causes the side door 150 to pivotally rotate between the closed position and the open position, as mentioned above.

The respective door actuators 170 and lifting actuators 180 of the end assemblies 160 on each side will typically have their operation synchronised to ensure smooth operation without inducing undesirable loading on the container 120 parts that could otherwise occur if this were not the case. In one example, master and slave phasing arrangement for synchronising the corresponding actuators 170 at each end. Alternatively, other synchronising techniques may be used, for instance a flow control system may be used.

Further specific implementation features of the end assemblies 160 will now be outlines with regard to FIGS. 3A to 3C and FIGS. 4A and 4B.

It will be appreciated that the end assemblies 160 may be configured to provide all of the necessary interfaces for supporting the container 120 and moving the components of the container 120 in a coordinated manner during the discharge of material. For instance, each end assembly 160 provides a floor pivot point 301 on the discharge side of the frame base 311 for interfacing with the second floor end 142 to thereby prevent that end of the floor 140 from lifting and thus allowing a discharge ramp to be formed as the container body 130 is lifted. A first container pivot point 302 is provided on the lifting actuator bracket 323 for interfacing to the first floor end 141 which in turn couples to the first container fitting 135 near the base of the second side wall 132. A second container pivot point 303 is provided on the second linkage end 332 for coupling to the second container fitting 136 near the base of the upper portion of the first side wall 131. Finally, the door actuator 170 provides a door pivot point 304 which interfaces with the door 150 to allow it to be opened and closed.

Figure 5A:
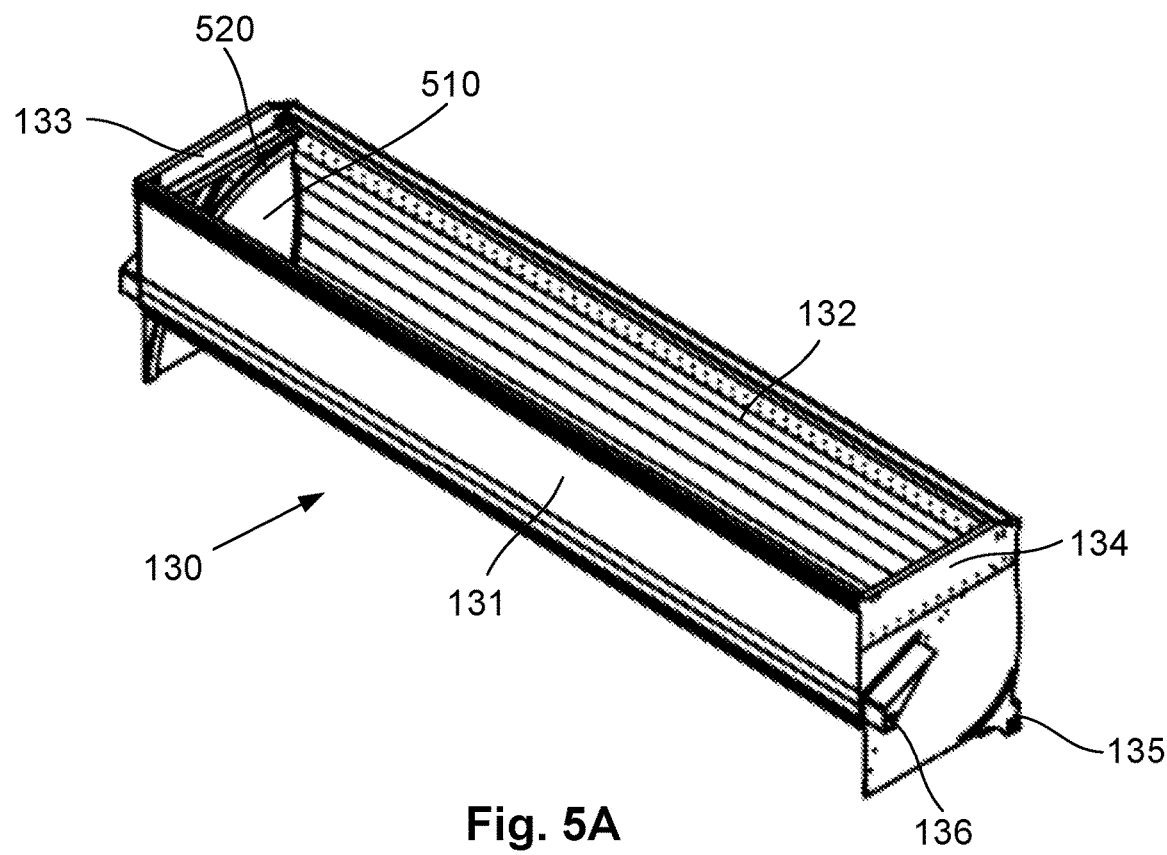
FIG. 5A is a first perspective view of the container body of the container of FIG. 1A.
Figure 5B:
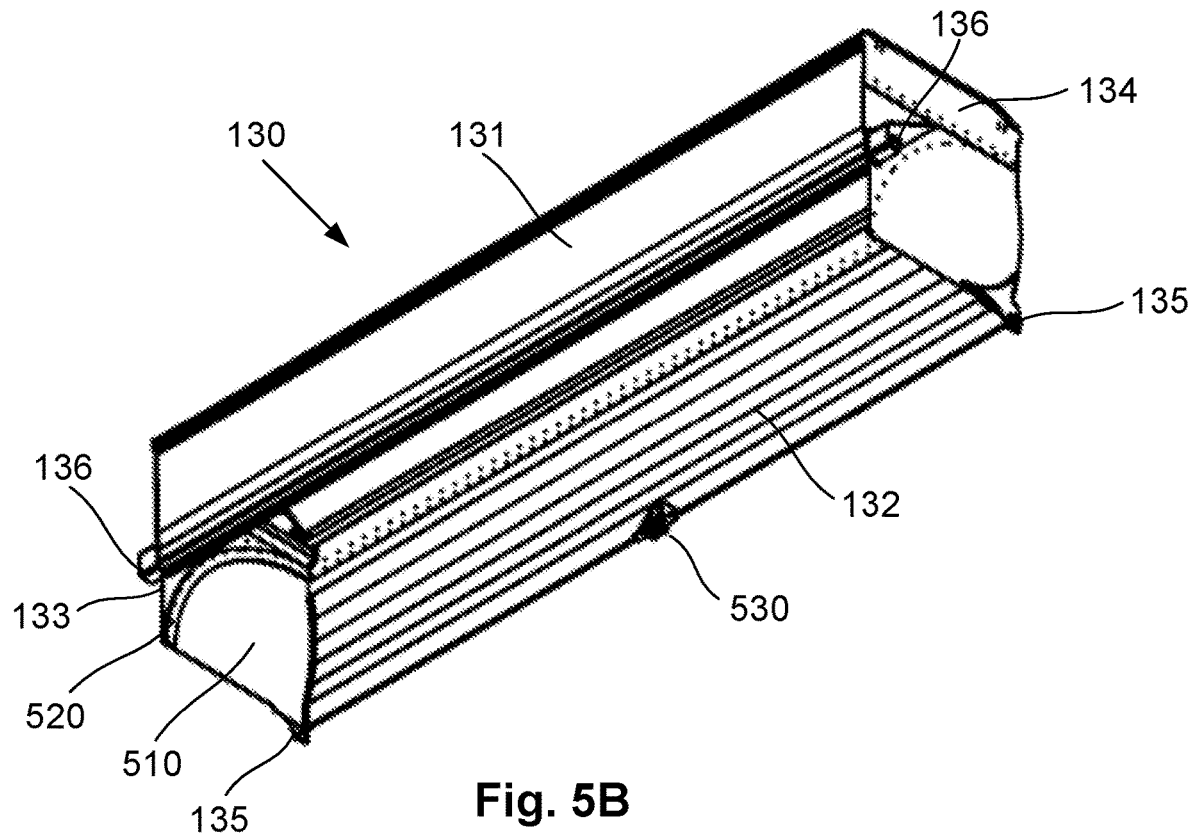
FIG. 5B is a second perspective view of the container body of FIG. 5A.

Turing to FIGS. 5A and 5B, specific features of the container body 130 can be seen including the placement of the first container fitting 135 and second container fitting 136 on each end wall 133, 134, which are the primary connection points for supporting the container body 130 and for enabling lifting and tipping of the container body 130 in use. The relative locations of the inside surfaces 510 and plate guides 520 corresponding to the end plates 143, 144 can also be seen, noting that the first and second container fittings 135, 136 are located outside of the inside surface 510.

The pivotal coupling between the base of the second side wall 132 and the door 140 may be facilitated by mounting a shaft or pins to the respective first container fitting 135 at each end wall 133, 134. However, in this case, an additional coupling point 530 is also provided at an approximate mid-point along the base of the second side wall 132 to provide additional support for this pivotal coupling.

Figure 6A:
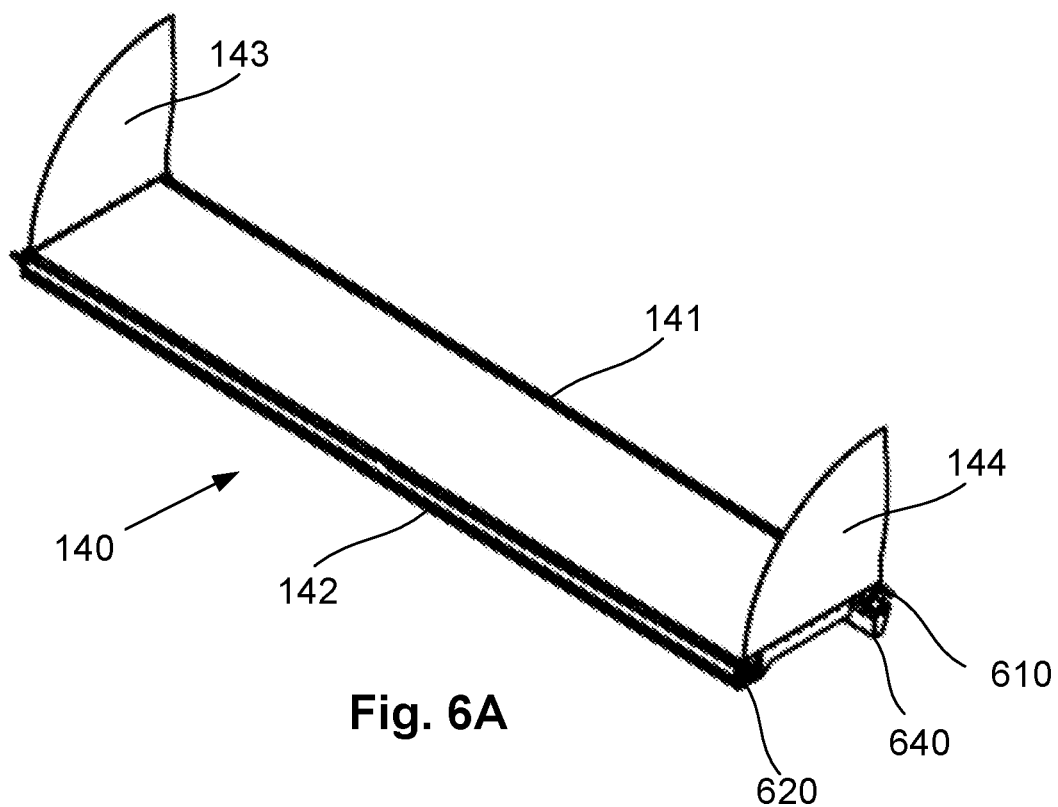
FIG. 6A is a first perspective view of the floor of the container of FIG. 1A.
Figure 6B:
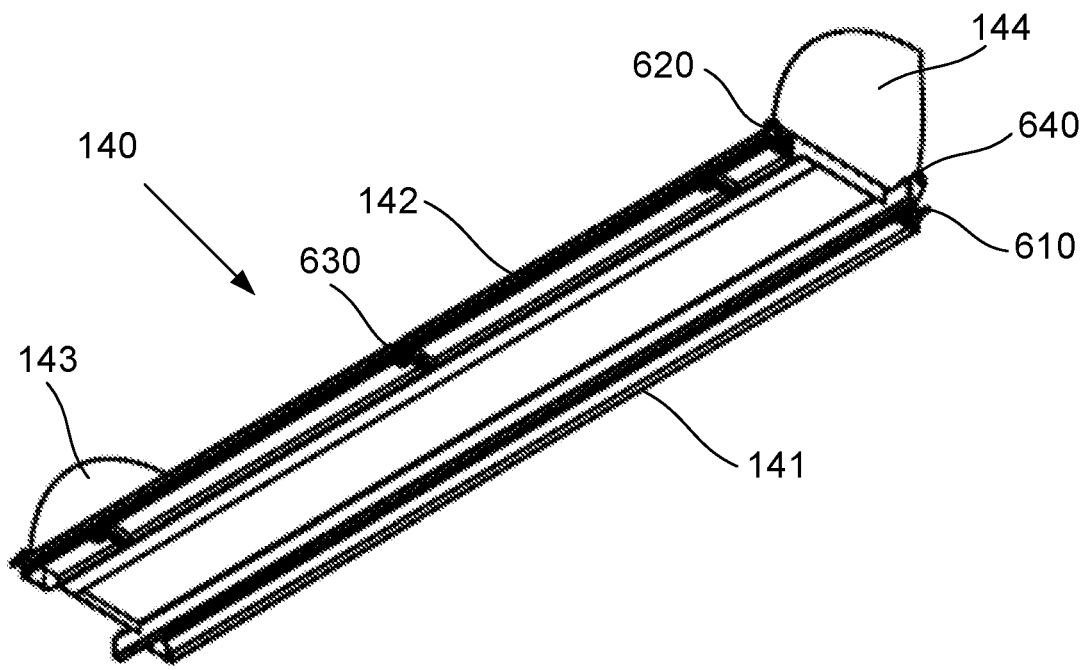
FIG. 6B is a second perspective view of the floor of FIG. 6A.

With regard to the detailed views of the floor 140 shown in FIGS. 6A and 6B, the curved edges of the end plates 143, 144 can be seen along with the particular interfaces with other components. The floor 140 may include a first floor fitting 610 at each end of the first door edge 141, which may be coupled to the first container fitting 135 of the container 120 for both coupling the floor 140 to the container.

The floor 140 may also include a second floor fitting 620 at each end of the second door edge 142 for coupling the floor 140 to the side door 150. As with the connection between the container body 130 and the door 140, an additional coupling point 630 is also provided at an approximate mid-point along the second floor edge 142 to provide additional support for this pivotal coupling.

The floor 140 may also include a lifting fitting 640, which may be provided for facilitating lifting of the container body 130 using the lever arm 162 when the lifting actuator 180 is extended. In this particular example, the lifting fitting 640 may be coupled to lifting bracket 323 at the second end 322 of the lever arm 162, via the first container pivot point 302 as mentioned above. However, it should be appreciated that this is but one example of a suitable coupling arrangement for facilitating lifting of the container body 130, but a range of different coupling arrangements may be used whilst providing similar functionality as hereinbefore described.

Figure 7A:
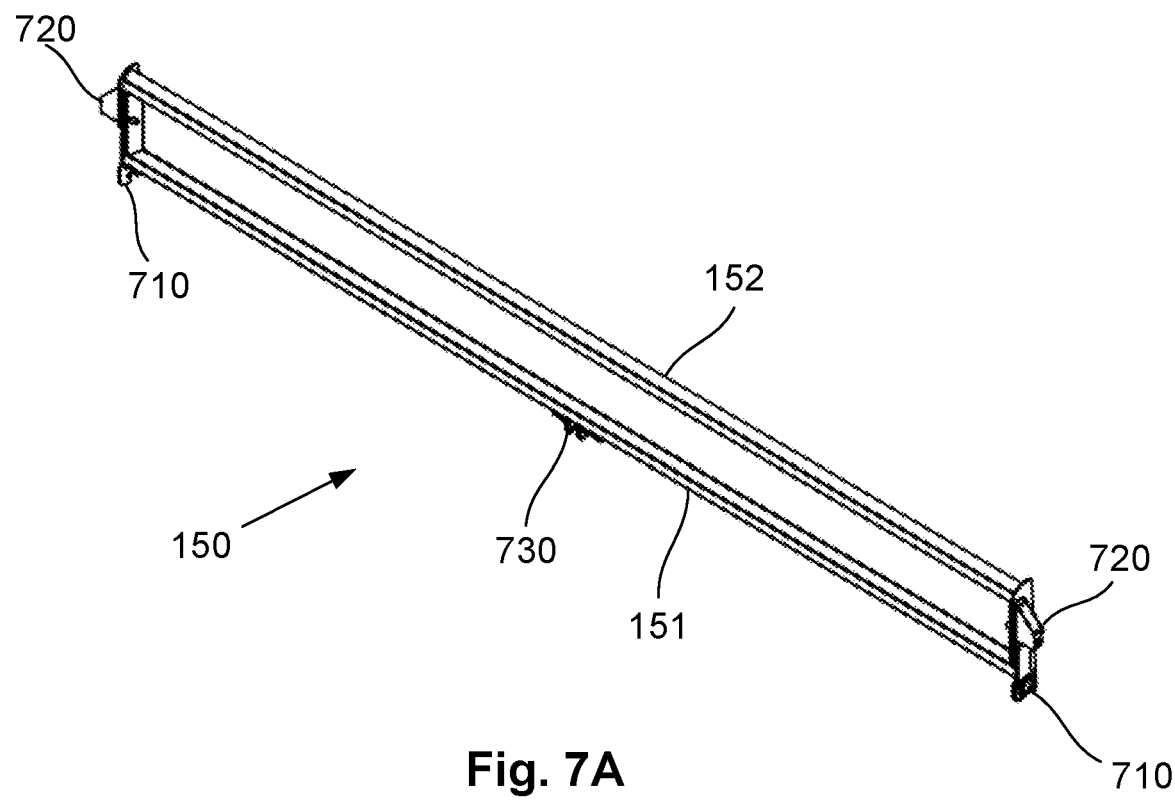
FIG. 7A is a first perspective view of the side door of the container of FIG. 1A.
Figure 7B:
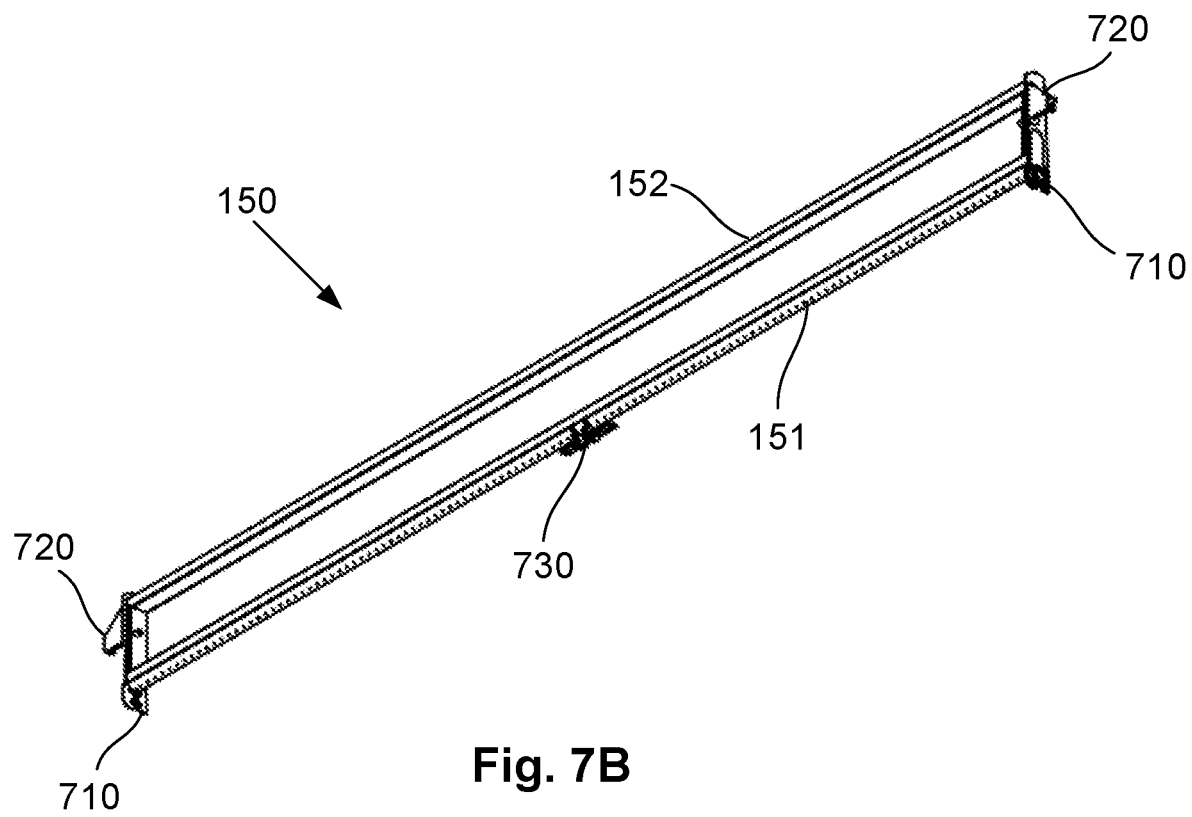
FIG. 7B is a second perspective view of the side door of FIG. 7A.

Finally, further details of the side door 150 can be seen in FIGS. 7A and 7B. The side door 150 may include first floor fittings 710 and an additional coupling point 730 for coupling with the corresponding second floor fittings 620 and additional coupling point 630 of the floor, to thereby facilitate the pivotal coupling between the side door 150 and the floor 140. In addition, the side door 150 may including protruding second door fittings 720 for allowing the door actuator to be coupled to the side door 150.

In any event, it will be appreciated that the particular implementation features discussed above are provided to assist understanding of the invention described herein but are not necessarily essential, and a range of different design approaches may be taken to provide equivalent functionality as broadly described.

In summary of the above, it will be appreciated that the system provides a side tipper arrangement which uses a container having a floor and side door that are moveable relative to a main container body such that, when the side door is open and the container body is lifted, material carried in the container can be effectively discharged through a discharge opening formed by opening the door. The discharge opening may be significantly enlarged as the container body is lifted, and the floor and side door may effectively form a discharge ramp for directing the flow of material to the discharge side of the vehicle. The container body may also be tipped as part of the lifting action to further enhance the discharge of material.

Importantly, the effective discharge of material to the side of the vehicle can be achieved by lifting the container body upwardly without having requiring substantial sideways movement of the container body of carried material, thereby significantly reducing the risk of tipping over that is often present in traditional side tipper designs. In contrast to conventional side tippers, embodiments of the system may be inherently stable in use.

Moreover, the container may be supported by and operationally controlled by end assemblies which provide the actuators for opening the side door and lifting/tipping the container body to cause the discharge of material. The end assemblies can be conveniently provided in a modular format in which only the end assemblies are mounted to the vehicle and provide all necessary interfaces to the container for achieving the above discussed functionalities.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The claims defining the invention are as follows:

1. A side tipper system for a vehicle including a chassis supported by wheels, the system including:
   a) a container for carrying material and selectively discharging carried material to a lateral discharge side of the chassis, the container including:
      i) a container body defining:
         (1) an upper portion of a first side wall of the container on the discharge side;
         (2) a second side wall of the container opposing the first side wall; and
         (3) a pair of opposing end walls of the container;
      ii) a floor pivotally coupled to the second side wall; and
      iii) a side door pivotally coupled to the floor, the side door defining a lower portion of the first side wall of the container in a closed position and forming a discharge opening in an open position; and
   b) first and second end assemblies configured to be mounted to the chassis at respective ends of the container, each end assembly being operatively coupled to the container for supporting the container relative to the chassis and for controlling the discharge of carried material from the container by:
      i) moving the side door from the closed position to the open position; and
      ii) lifting the container body relative to the chassis, to thereby cause carried material to be discharged to the discharge side via the discharge opening.

2. A system according to claim 1, wherein the end assemblies are configured so that lifting the container body causes the floor to pivotally rotate away from the container body to thereby define a discharge ramp for directing material to the discharge side.

3. A system according to claim 2, wherein at least one of:
   a) the end assemblies are configured so that lifting the container body causes the floor to be oriented at a ramp angle that depends on a lifting height to which the container body is lifted; or
   b) the side door in the open position effectively extends the discharge ramp laterally beyond the chassis on the discharge side.

4. A system according to claim 1, wherein the end assemblies are configured so that lifting the container body causes the container body to tip away from the discharge side.

5. A system according to claim 4, wherein the end assemblies are configured so that lifting the container body causes the second side wall to be oriented at a tipping angle that depends on a lifting height to which that the container body is lifted.

6. A system according to claim 5, wherein, when the container body is lifted to a predetermined lifting height, at least one of:
   a) the second side wall and the floor are substantially aligned; or
   b) the second side wall, the floor and the side door are substantially aligned to define a substantially continuous discharge ramp.

7. A system according to claim 1, wherein the side door is substantially aligned with the upper portion of the first side wall in the closed position and substantially aligned with the floor in the open position.

8. A system according to claim 1, wherein, when the container body is not lifted:
   a) a base of the upper portion of the first side wall is offset from the floor; and
   b) the side door extends between the floor and the offset base of the upper portion of the first side wall in the closed position.

9. A system according to claim 8, wherein:
   a) moving the side door to the open position forms the discharge opening between the floor and the offset base of the upper portion of the first side wall; and
   b) lifting the container body expands the discharge opening.

10. A system according to claim 1, wherein the floor includes:
    a) a first floor edge that is pivotally coupled to a base of the second side wall; and
    b) an opposing second floor edge that is pivotally coupled to the side door.

11. A system according claim 10, wherein at least one of:
    a) the side door includes:
       i) a first door edge that is pivotally coupled to the second floor edge; and
       ii) an opposing second door edge that abuts a base of the upper portion of the first side wall when the side door is in the closed position; or
    b) the second floor edge is pivotally coupled to the end assemblies such that the second floor edge is not lifted when the container body is lifted.

12. A system according to claim 1, wherein the floor includes a pair of opposing end plates protruding from respective ends of the floor such that, when the container body is not lifted, the end plates extend inside the container body alongside the end walls, and when the container body is lifted, the end plates extend between the floor and the end walls.

13. A system according to claim 12, wherein at least one of:
    a) each end plate includes a curved edge;
    b) each end wall has a smooth inside surface having a shape corresponding to a respective end plate shape; and
    c) each end wall includes a plate guide for supporting an edge of a respective end plate.

14. A system according to claim 1, wherein each end assembly is provided as a modular assembly that can be adapted for use at either end of the container.

15. A system according to claim 1, wherein each end assembly includes a lifting actuator for lifting the container body relative to the chassis.

16. A system according to claim 15, wherein each end assembly includes:
    a) a frame;
    b) a lever arm pivotally coupled to the frame and the container body; and
    c) a linkage pivotally coupled to the frame and the container body.

17. A system according to claim 16, wherein at least one of:
    a) the lifting actuator pivotally rotates the lever arm relative to the frame for lifting the container body and the linkage controls an orientation of the container body as the container body is lifted;
    b) the lifting actuator is pivotally coupled to the frame and the lever arm; or
    c) the lifting actuator is pivotally coupled to the frame and the lever arm, and the lifting actuator is a cylinder actuator configured so that extension of the lifting actuator causes the lever arm to pivotally rotate relative to the frame, thereby causing the container body to be lifted.

18. A system according to claim 16, wherein the frame includes:
    a) a frame base for mounting the end assembly to the chassis, wherein the lever arm has a first lever end pivotally coupled to the frame base on the discharge side and a second lever end pivotally coupled to the container body proximate to the base of the second side wall; and
    b) a frame arm extending away from the discharge side, wherein the linkage has a first linkage end pivotally coupled to a distal end of the frame arm and a second linkage end pivotally coupled to the container body proximate to the base of the upper portion of the first side wall.

19. A system according to claim 1, wherein each end assembly includes a door actuator for moving the side door between the closed position and the open position, and wherein at least one of:
    a) each end assembly includes a frame and a lever arm pivotally coupled to the frame, and wherein the door actuator is pivotally coupled to the lever arm and the side door; or
    b) the door actuator is a cylinder actuator configured so that extension of the door actuator causes the side door to pivotally rotate between the closed position and the open position.

20. A vehicle including:
    a) a chassis supported by wheels; and
    b) a side tipper system according to claim 1.

* * * * *